Figure 1:
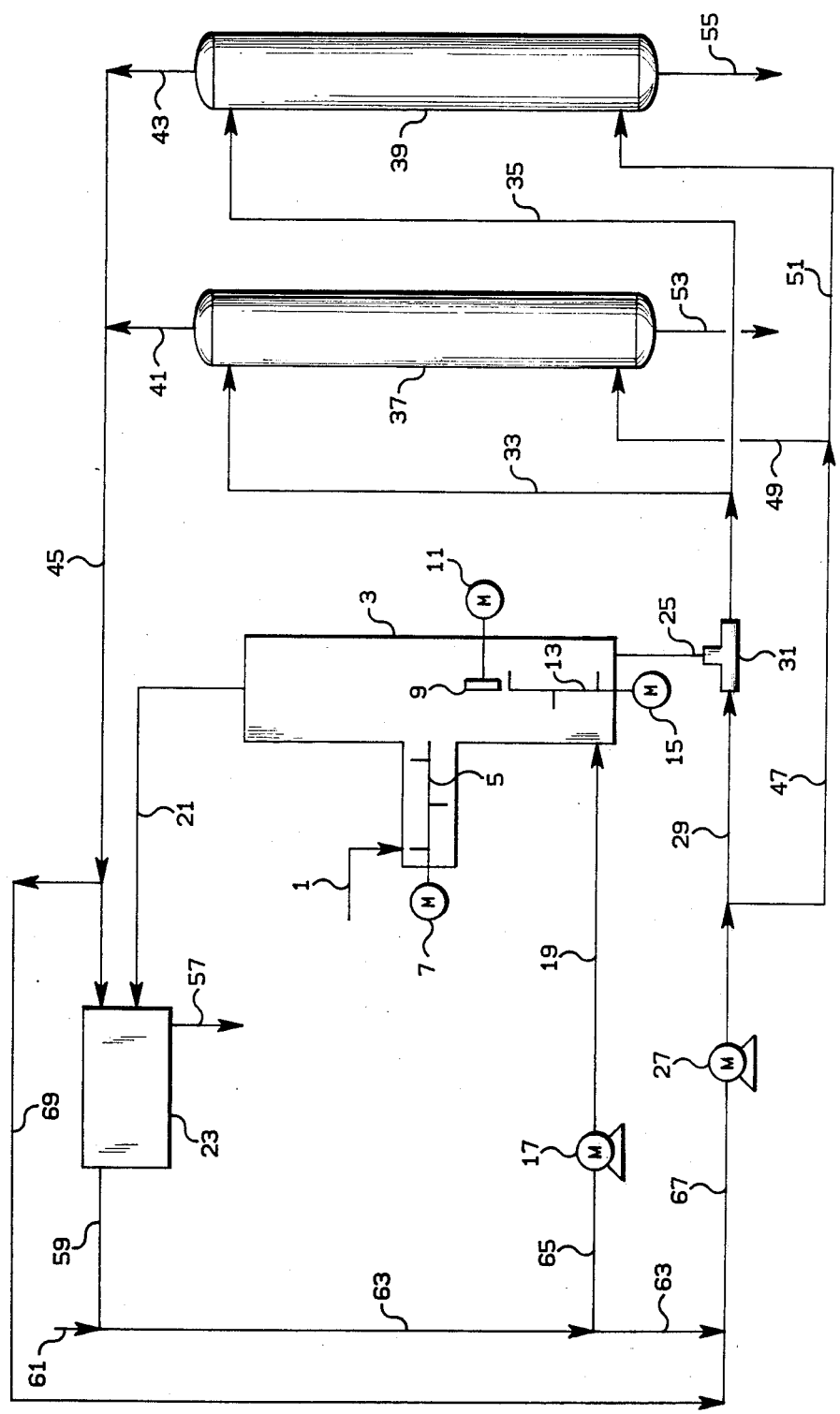

United States Patent [19]

Miles

[11] Patent Number: 4,575,950
[45] Date of Patent: Mar. 18, 1986

[54] METHOD FOR REMOVAL OF RESIDUAL SOLVENT FROM PARTICULATE CRUMB MADE BY SOLUTION POLYMERIZATION

[75] Inventor: John M. Miles, Overijse, Belgium

[73] Assignee: Phillips Petroleum Company, Bartlesville, Okla.

[21] Appl. No.: 549,719

[22] Filed: Nov. 8, 1983

[51] Int. Cl.$^4$ .............................................. F26B 3/06
[52] U.S. Cl. ......................................... 34/27; 34/32; 34/36; 34/54; 34/191; 528/483; 528/503
[58] Field of Search ................. 34/27, 32, 36, 54, 191; 134/21, 25.1, 25.5; 264/37, 85; 528/433, 501, 503

[56] References Cited

U.S. PATENT DOCUMENTS

| | | | |
|---|---|---|---|
| 1,631,052 | 5/1927 | Oertel | 34/27 |
| 3,233,334 | 2/1966 | Hamilton | 34/191 |
| 3,307,271 | 3/1967 | Simpson | 34/36 |
| 3,310,882 | 3/1967 | Barber et al. | 34/10 |
| 3,513,141 | 5/1970 | Wright et al. | 528/483 |
| 3,815,833 | 6/1974 | Van Vliet et al. | 241/5 |
| 3,862,103 | 1/1975 | Campbell et al. | 260/94.7 R |
| 3,869,807 | 3/1975 | Perry | 34/33 |
| 4,310,973 | 1/1982 | King | 34/36 |
| 4,395,542 | 7/1983 | Sury | 528/483 |
| 4,475,293 | 10/1984 | Banerjee | 34/54 |

Primary Examiner—Albert J. Makay
Assistant Examiner—David W. Westphal
Attorney, Agent, or Firm—A. W. Umphlett

[57] ABSTRACT

A method for removing residual solvent dissolved in non-sticky crumb particles produced by solution polymerization that have been treated substantially to remove solvent from the polymer surface. Particles are transferred into a closed storage zone under inert atmosphere conditions and are maintained for a period of time sufficient to allow diffusion of solvent from the particles as free solvent. Inert gas is then passed through the storage zone to remove the free solvent. The processes of allowing diffusion followed by purging of the free solvent is repeated as necessary.

6 Claims, 1 Drawing Figure

METHOD FOR REMOVAL OF RESIDUAL SOLVENT FROM PARTICULATE CRUMB MADE BY SOLUTION POLYMERIZATION

BACKGROUND OF THE INVENTION

This invention relates to the removal of solvent. In one of its aspects, this invention relates to the removal of residual solvent from particulate crumb produced by solution polymerization. In another of its aspects, this invention relates to a process for further removal of residual solvent from solution polymerization particles after the particles have been treated by powder form evaporation. In still another aspect of the invention, it relates to an integrated process for removal of solvent using inert gas which is then recycled for further use.

The removal of residual solvent from solid polymer particles such as solution rubber is difficult because there is residual solvent dissolved in the solid polymer which must diffuse from the polymer to be removed. This makes the process of residual solvent removal from these solution polymers time dependent. Although most of the solvent can be removed from the surface of the polymer by various evaporative techniques, solvent will still remain dissolved in the polymer. Gas purging can only remove solvent from the particle surface and this can be done in a short period of time. With the realization that there must be time for the dissolved solvent to diffuse from the polymer particles, it has become apparent that continuous purging of the polymer particles would only be a waste of gas and would complicate recovery of solvent from the purge gas since it would be present in a low concentration. The present invention provides an intermittent procedure for purging the polymer which greatly reduces the volume of inert gas used and inherently enhances solvent recovery since the same amount of purged solvent will be contained in a greatly reduced volume of purge gas.

It is therefore an object of this invention to provide a method for removing residual solvent dissolved in particulate crumb produced by solution polymerization. It is another object of this invention to provide a polymeric product made by solution polymerization from which dissolved, residual solvent has been at least partially removed.

It is still another object of this invention to provide a method for recovering polymer produced by solution polymerization processes from the solvent of the process using a method for substantially removing solvent from the surface of the polymer, particularly powder form evaporation, and then removing residual solvent that has been dissolved in the polymer with an integrated process for collecting inert purge gas with recovery and recycle of the purge gas.

Other aspects, objects and the various advantages of this invention will become apparent on reading the specification and claims of this disclosure in conjunction with a study of the drawing.

SUMMARY OF THE INVENTION

According to this invention, a method is provided for removing residual solvent dissolved in non-sticky crumb particles prepared by solution polymerization that have been treated substantially to remove solvent from the polymer surface. In the method, the particles containing residual solvent are transferred into a closed storage zone in an inert atmosphere, after which (1) the particles are maintained in the storage zone at a temperature below the softening point of the polymer for a period of time sufficient for diffusion of solvent from particles as free solvent and, subsequently, (2) an inert gas is passed through the polymer particles at a temperature below the softening point of the polymer in an amount sufficient substantially to remove the free solvent from the storage zone, and steps (1) and (2) are repeated until a desired level of solvent content is obtained in the polymer in the storage zone.

In a further embodiment of this invention, the polymer containing residual solvent has been specifically treated for removal of surface solvent by powder form evaporation and the inert gas used for both the powder form evaporation and in the process of the present invention are recovered and treated to recover the solvent and provide inert gas of sufficiently low solvent content to be useful, both in the powder form evaporation process and in the process of this invention.

Although the process of the present invention is designed for operation on the product from a powder form evaporation, it should be useful with any process that produces solution polymers and recovers a non-sticky crumb particle having a residual solvent dissolved therein.

The powder form evaporation process is described in U.S. Pat. No. 4,310,973, incorporated here by reference. It is stated in that patent that the powder form evaporation process is most readily applicable to any polymer solution that can yield a flowable crumb at a temperature of 20° F. to about 50° F. (11°-28° C.) above the normal boiling point of the solvent. That is, the process can be used on any solution of a normally solid polymer which can be particulated in a spraying device as not unduly sticky at a temperature necessary to evaporate the solvent. Suitable polymers include polymers and copolymers of butadiene, styrene, isoprene, polyolefins, and the like. The solvents used will, of course, depend on the polymer to be processed.

Most rubber solutions, meet the requirements above. The powder form evaporation process and the present process are especially applicable for the recovery of polymers from the solutions of rubbery polymers. A specific rubber solution that is of interest in this invention is that of a rubbery copolymer of 75 weight percent butadiene and 25 weight percent styrene in a solvent of cyclohexane.

In the powder form evaporation process, the polymer solution is dried by the removal of solvent by flashing the polymer solution as it is sprayed into a bed of substantially dry polymer particles. The polymer particles coat the partially dried solution polymer droplets and the remaining solvent is removed, using the energy produced from a mechanical agitation of the bed and a countercurrent passing of a heated inert gas through the polymer bed. The polymer that is removed from the evaporation process is a particulate product that can best be described as granules or crumb, although some particles may approach powder in size, depending on the polymer. The products from the powder form evaporation process normally will pass to storage silos for blending, testing and subsequent utilization or sales. The product, if sufficiently free of solvent, is suitable for sale or direct use in many applications without extrusion or devolatilization, pelleting, or other such preparations of polymer. Since the polymer normally will have solvent dissolved within the particles, the present invention provides for an intermittent inert gas purge of the storage facilities to sweep out residual solvent which diffuses from the pores and surfaces of the granules into the void space of the storage zone.

The process of the invention including the recovery of inert gas, removal of solvent from the inert gas and recycle of the inert gas can best be understood in conjunction with the drawing which is a schematic representation of the integrated process for removing solvent from the polymer with recovery and recycle of inert gas.

Referring now to the drawing, an integrated system is presented in which polymer-solvent cement is fed into a powder form evaporator to produce polymer containing dissolved solvent which is transferred to storage zones and treated by the process of this invention with the nitrogen used as inert gas in the process of the invention being further treated for removal of the solvent in accordance with an embodiment of the invention and recycled for further use.

In the drawing, which is a schematic representation of the process, a polymer-solvent cement is fed to line 1 into a powder form evaporating unit 3. The powder form evaporator which contains a charge of polymer powder which has been raised to operating temperature of about 200° F. by mechanical agitation with agitator 5 which is driven by motor 7 operates by surrounding the polymer-solvent cement sprayed from line 1 into the evaporator with the fine powder agitated by agitator 5 so that a non-sticky agglomerated particle of polymer-solvent cement surrounded by polymer powder is formed. This material passes into the vertical portion of the evaporator in which particles that have agglomerated into slurry like masses are contacted with grinder 9 driven by motor 11 and broken into smaller particles. These smaller particles are stirred by agitator 13 driven by motor 15 as nitrogen supply through blower 17 enters into the base of evaporator 3 through line 19 to provide further drying of the particles by picking up solvent vapor and removing it through the top of the evaporator and line 21 back to a nitrogen-solvent separation process 23. In the process of drying in the evaporator unit, powdered polymer is continuously produced for contact with the incoming polymer-solvent cement so that the process constantly renews itself while solvent bearing nitrogen passes up to the evaporator and out line 21 and dried polymer particles containing a trace of solvent dissolved in the polymer particles are removed through line 25 to be carried by nitrogen supplied by nitrogen blower 27 and line 29 through jet 31 and lines 33, 35 into storage vessels 37, 39.

In the storage vessels, the relatively heavy particles are dropped into the base of the storage zone while the nitrogen exits through the top of the storage vessels through lines 41, 43 and 45 to be returned to the nitrogen-solvent separation process 23.

It is at this point that the process of the present invention begins. In the usual handling of stored polymer which has either surface solvent or solvent that can diffuse from the polymer into the voids in the storage zone, a continuous purge of inert gas is passed through the particles to remove free solvent as it appears in the voids. In the present invention, the particulate material within the storage zone is held in an atmosphere of nitrogen for a period of time sufficient for a substantial diffusion of solvent from the particles as free solvent. This diffusion period extends for a period of about 1 to about 24 hours, preferably for a period of about 2 to about 12 hours and is followed by a period in which the purge gas—the same inert gas, here nitrogen, is supplied from blower 27 to lines 47, 49, 51 into the base of storage vessels 37, 39 to sweep through the stored particles, removing the free solvent through lines 41, 43, 45 to the nitrogen-solvent separation operation 23.

In the purge operation, the temperature is not critical as long as the softening point of the polymer is not exceeded. For most polymers, temperatures from ambient to about 200° F. are satisfactory with the higher temperatures within this range promoting more rapid diffusion. The volume of the purged gas used for individual purges is in a range of about 1 to about 20 volumes of gas (measured at storage silo conditions) per volume of polymer bed. A range of about 2 to about 4 volumes of gas per volume of polymer bed is, however, more preferred. The purge pressure is preferably slightly above atmospheric to facilitate transport of the effluent gas through the storage zone. The purge velocity is not important as long as transport velocity for the particles is not exceeded. Pressure drop across the storage bed is most desirably kept less than about 5 psi (34.5 KPA). With the parameters given above, the purge time from the average sized storage zone will generally be less than 1 minute per cycle (the time is a function of the purge gas volume, superficial gas velocity, and the bed height). The purge cycle, i.e., to maintain the particles in a quiescent state for a period of time followed by a burst purge, can be repeated as desired to provide a polymer having a solvent content within a given range. Products having attained this range can be removed through lines 53, 55 for transport or sale.

As an illustration of embodiments of the invention, note that the passage of nitrogen from blower 17, line 19 through the evaporator 3 and line 21 into nitrogen-solvent separation process 23 will normally be carried on continuously with removed solvent exiting the separation through line 57 and nitrogen, at least reduced sufficiently in solvent content to be effective in the powder form evaporator system passed through line 59 with addition of make-up nitrogen through line 61 as necessary, line 63 and line 65 back to blower 17 for recirculation. During the same time period, but occurring at intervals, nitrogen supplied through line 59, 63 and 67 is passed through blower 27 and lines 47, 49, 51 as purge gas throught storage zones 37, 39 and lines 41, 43, 45 back to the nitrogen-solvent separation process 23. If the amount of solvent picked up by the purge process is sufficiently small that the nitrogen can be used effectively for more than one pass through the storage zone, the purge gas with solvent passing through line 45 can be diverted through line 69 around the nitrogen-solvent separation process 23 to be returned directly through line 67 to the blower 27. This prevents unnecessary loading of the nitrogen-solvent separation process 23 and is a further improvement of this invention over a normally purged storage zone which with a continuous purge of gas carrying a small volume of solvent would unduly load the nitrogen-solvent separation process as compared to a short blast of purged gas containing a relatively larger amount of solvent which in either case would be in addition to the continuous amount passing through the powder form evaporator.

To illustrate the effectiveness of the process of this invention, the following experimental example is offered. A 24 inch diameter powder form evaporator was operated to dry a butadiene-styrene solution rubber at a solids rate of 297 pounds per hour. Polymer solution was flashed from 15.1 to 23.1 weight percent and fed into a 4 feet deep bed of agitated polymer particles. The bed temperature was 224° F. at the top and 199° F. at the bottom. Polymer residence time was approximately 80 minutes. Nitrogen circulating rate was 20 scfm (standard cubic feet/minute) and the nitrogen make-up was 2-3 scfm. A 5 gallon bucket of dry product was collected and stored overnight under a blanket of nitrogen. The polymer was purged with a 30 second blast of nitrogen. After a delay of about 12 hours, the polymer was purged with the second 30 second blast of nitrogen. Analyses in the following table show the result.

TABLE I

|  | Collected Polymer Sample | Polymer After First Purge | Polymer After Second Purge |
|---|---|---|---|
| Cyclohexane | 5009 ppm | 4660 ppm | 4202 ppm |
| n-Hexane | 385 ppm | 396 ppm | 391 ppm |
| Total | 5394 | 5056 | 4593 |

These data indicate a substantial reduction of solvent content of the polymer after each short period.

I claim:

1. A method for removing residual solvent dissolved in non-sticky crumb particles of polymer produced by solution polymerization said particles having been treated substantially to remove solvent from the surface of the polymer crumb particles, said method comprising:
   (1) transferring said particles containing residual dissolved solvent into a closed storage zone in an inert atmosphere,
   (2) maintaining said particles containing residual solvent in said zone in a quiescent state at a temperature below the softening point of the polymer for a period of time sufficient for accumulation of solvent diffused from said particles as free solvent,
   (3) passing inert gas through said polymer particles in said storage zone at a temperature below the softening point of the polymer in an amount sufficient substantially to remove the accumulation thereof free solvent from said storage zone, and
   (4) repeating steps (2) and (3) alternately until solvent content in the polymer particles in the storage zone is reduced to the desired level.

2. A method of claim 1 wherein said period sufficient for diffusion is about 1 to about 24 hours, said temperatures are in the range from ambient to about 200° F., and said amount of purge gas is in an amount of about 1 to about 20 volumes of gas per volume of polymer bed.

3. A method of claim 2 wherein said period sufficient for diffusion is about 2 to about 12 hours and where the amount of purge gas is in an amount of about 2 to about 4 volumes gas per volume of polymer bed.

4. A method of claim 1 wherein polymer has been treated by powder form evaporation, the inert gas is the same type used in the particle form evaporation system and the gas passed through the storage zone is treated for solvent removal along with the inert gas from the particle form evaporation system and recycled after solvent removal.

5. A method of claim 1 wherein the inert gas after passing through the storage zone has a content of solvent sufficiently low that it is recycled without solvent removal through the storage zone.

6. A method of claim 5 wherein the polymer is butadiene-styrene solution rubber, the solvent removed is cyclohexane, and the inert gas is nitrogen.

* * * * *